(12) United States Patent
Haga et al.

(10) Patent No.: US 10,079,383 B2
(45) Date of Patent: Sep. 18, 2018

(54) ALL-SOLID BATTERY AND METHOD FOR MANUFACTURING THE SAME

(71) Applicants: Kengo Haga, Susono (JP); Norihiro Ose, Sunto-gun (JP); Hajime Hasegawa, Susono (JP)

(72) Inventors: Kengo Haga, Susono (JP); Norihiro Ose, Sunto-gun (JP); Hajime Hasegawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 14/760,871

(22) PCT Filed: Jan. 14, 2014

(86) PCT No.: PCT/IB2014/000026
§ 371 (c)(1),
(2) Date: Jul. 14, 2015

(87) PCT Pub. No.: WO2014/111789
PCT Pub. Date: Jul. 24, 2014

(65) Prior Publication Data
US 2015/0357674 A1 Dec. 10, 2015

(30) Foreign Application Priority Data

Jan. 15, 2013 (JP) ................................. 2013-004877

(51) Int. Cl.
*H01M 4/04* (2006.01)
*H01M 4/13* (2010.01)
(Continued)

(52) U.S. Cl.
CPC ......... *H01M 4/0471* (2013.01); *H01M 4/136* (2013.01); *H01M 4/1397* (2013.01); *H01M 4/5815* (2013.01); *H01M 4/661* (2013.01); *H01M 10/052* (2013.01); *H01M 10/0525* (2013.01); *H01M 10/0562* (2013.01);
(Continued)

(58) Field of Classification Search
CPC . H01M 10/0562; H01M 10/0525; H01M 4/66
See application file for complete search history.

(56) References Cited

U.S. PATENT DOCUMENTS 3,756,789 A * 9/1973 Alder ...................... H01M 4/06
428/615
4,071,665 A * 1/1978 Garth ...................... H01M 4/06
429/337
(Continued)

FOREIGN PATENT DOCUMENTS

| JP | 2010-033918 A | 2/2010 |
|---|---|---|
| JP | 2010-097811 A | 4/2010 |

(Continued)

*Primary Examiner* — Jonathan Crepeau
*Assistant Examiner* — Angela J Martin
(74) *Attorney, Agent, or Firm* — Oliff PLC

(57) ABSTRACT

An all-solid battery that includes a negative electrode layer, a positive electrode layer, a solid electrolyte layer disposed between the positive electrode layer and the negative electrode layer, a negative electrode current collector connected to the negative electrode layer, and a positive electrode current collector connected to the positive electrode layer, wherein the negative electrode layer contains a sulfide solid electrolyte, the negative electrode current collector contains a metal that reacts with the sulfide solid electrolyte, a sulfur compound layer that contains a sulfur compound generated by a reaction of the sulfide solid electrolyte and the metal is present between the negative electrode layer and the negative electrode current collector, charge capacity when constant current charge was conducted up to 3.6 V at 0.3 C or more and 3.6 C or less in an initial charge after preparation of the all-solid battery is 50 mAh/g or more and 90 mAh/g or less.

4 Claims, 4 Drawing Sheets

(51) Int. Cl.
*H01M 10/05* (2010.01)
*H01M 4/136* (2010.01)
*H01M 4/1397* (2010.01)
*H01M 4/58* (2010.01)
*H01M 4/66* (2006.01)
*H01M 10/052* (2010.01)
*H01M 10/0525* (2010.01)
*H01M 10/0562* (2010.01)
*H01M 4/133* (2010.01)
*H01M 4/1393* (2010.01)
*H01M 4/505* (2010.01)
*H01M 4/525* (2010.01)

(52) U.S. Cl.
CPC ............ *H01M 4/043* (2013.01); *H01M 4/133* (2013.01); *H01M 4/1393* (2013.01); *H01M 4/505* (2013.01); *H01M 4/525* (2013.01); *H01M 2220/20* (2013.01); *H01M 2220/30* (2013.01); *H01M 2300/0068* (2013.01); *Y10T 29/4911* (2015.01)

(56) References Cited

U.S. PATENT DOCUMENTS

| | | |
|---|---|---|
| 2011/0065007 A1 | 3/2011 | Kamiya et al. |
| 2012/0225351 A1* | 9/2012 | Kojima ............... H01M 4/0404 429/211 |
| 2014/0082931 A1 | 3/2014 | Nishino et al. |

FOREIGN PATENT DOCUMENTS

| | | | |
|---|---|---|---|
| JP | 2011-060649 A | 3/2011 | |
| JP | 2012-049023 A | 3/2012 | |
| JP | 2012049023 * | 3/2012 | ............. H01M 4/13 |
| JP | 2012-094437 A | 5/2012 | |
| JP | 2012-243476 A | 12/2012 | |
| JP | 2014-137869 A | 7/2014 | |
| KR | 2011-0082506 A | 7/2011 | |
| WO | 2011/064842 A1 | 6/2011 | |
| WO | 2012/164723 A1 | 12/2012 | |
| WO | 2014/111791 A1 | 7/2014 | |

* cited by examiner

ALL-SOLID BATTERY AND METHOD FOR MANUFACTURING THE SAME

BACKGROUND OF THE INVENTION

1. Field of the Invention

The invention relates to an all-solid battery and a method for manufacturing the all-solid battery.

2. Description of Related Art

A lithium ion secondary battery has an energy density higher than that of a conventional secondary battery and can be operated at high voltages. Therefore, it is used in information instruments such as a cellular phone and the like as a secondary battery that can be readily down-sized and light-weighted. In recent years, the lithium ion secondary battery also has a high demand for large engines such as those in electric vehicles, hybrid vehicles, and the like.

A lithium ion secondary battery has a positive electrode layer, a negative electrode layer, and an electrolyte layer disposed therebetween. As the electrolyte used in the electrolyte layer, for example, a nonaqueous liquid or solid substance is known. When the liquid electrolyte (hereinafter, referred to as "electrolytic solution") is used, the electrolytic solution is likely to permeate to the inside of the positive electrode layer or negative electrode layer. Therefore, an interface is likely to be formed between an active material contained in the positive electrode layer or negative electrode layer and the electrolytic solution, and performance is likely to be improved. However, since the broadly used electrolytic solution is inflammable, a system for securing safety has to be mounted. On the other hand, when a solid electrolyte that is non-flammable (hereinafter, referred to as "solid electrolyte") is used, the system can be simplified. Therefore, a lithium ion secondary battery (hereinafter, referred to as "all-solid battery") having a form provided with a layer that contains the solid electrolyte (hereinafter, referred to as "solid electrolyte layer") is under development.

As a technique relating to such an all-solid battery, Japanese Patent Application Publication No. 2011-060649 (JP 2011-060649 A), for example, discloses an electrode active material layer that includes an electrode active material, and a sulfide solid electrolyte material that fuses to a surface of the electrode active material and does not substantially contain cross-linked sulfur, and an all-solid battery provided with the electrode active material layer. Further, Japanese Patent Application Publication No. 2012-094437 (JP 2012-094437 A) discloses an all-solid battery that includes a positive electrode active material layer that contains a positive electrode active material, a negative electrode active material layer that contains a negative electrode active material, and a solid electrolyte layer formed between the positive electrode active material layer and negative electrode active material layer. In the all-solid battery, the solid electrolyte layer is obtained by powder compacting the solid electrolyte material, and in a gap between the solid electrolyte materials an insulating material having a withstand voltage higher than argon is disposed.

In the all-solid battery, from a viewpoint that performance can be readily improved, a sulfide solid electrolyte is used as the solid electrolyte in some cases. Also in Japanese Patent Application Publication Nos. 2011-060649 and 2012-094437 (JP 2011-060649 A and JP 2012-094437 A), an all-solid battery that includes a negative electrode layer containing a sulfide solid electrolyte is described. Further, Cu is broadly used as a negative electrode current collector for all-solid batteries because it has low electric resistivity, can be readily processed, and is low in cost. Also in JP 2011-060649 A and JP 2012-094437A, it is described that Cu is used as the negative electrode current collector.

However, in the all-solid battery that includes a negative electrode that contains sulfur (a negative electrode layer that contains a sulfide solid electrolyte, for example), when a metal that reacts with sulfur such as Cu is used in the negative electrode layer, a problem that the metal reacts with sulfur and electronic conduction resistance tends to increase in an interface between the negative electrode layer and the negative electrode current collector is apprehended (see Japanese Patent Application Publication No. 2012-49023 (JP 2012-49023 A).

SUMMARY OF THE INVENTION

The invention improves an, output in an all-solid battery in which a sulfide solid electrolyte contained in a negative electrode layer and a metal contained in a negative electrode current collector react with each other. Further, the invention provides a method for manufacturing an all-solid battery whose output is improved like this.

As described above, it has been considered that when a metal such as Cu, Fe, Ni, Co, or Ti that reacts with a sulfide solid electrolyte is used in the negative electrode current collector in an all-solid battery that includes a negative electrode layer containing a sulfide solid electrolyte, the metal reacts with the sulfide solid electrolyte contained in the negative electrode layer, and the electronic conduction resistance tends to increase in an interface between the negative electrode layer and the negative electrode current collector. However, an influence of the reaction on performance of an actual all-solid battery has not been fully studied. The inventors have found that, when the metal contained in the negative electrode current collector and the sulfide solid electrolyte contained in the negative electrode layer are allowed to react with each other to a certain degree, particularly in a low SOC (low voltage region), the output can be improved in comparison with a conventional all-solid battery. The invention was completed based on the findings.

A first aspect of the invention is an all-solid battery that includes a negative electrode layer, a positive electrode layer, a solid electrolyte layer disposed between the positive electrode layer and the negative electrode layer, a negative electrode current collector connected to the negative electrode layer, and a positive electrode current collector connected to the positive electrode layer. In the all-solid battery, the negative electrode layer contains a sulfide solid electrolyte, the negative electrode current collector contains a metal that reacts with the sulfide solid electrolyte, a sulfur compound layer that contains a sulfur compound generated by a reaction of the sulfide solid electrolyte contained in the negative electrode layer and the metal contained in the negative electrode current collector is present between the negative electrode layer and the negative electrode current collector, and in an initial charge after preparation of the all-solid battery, a charge capacity when a constant current charge was conducted up to 3.6 V at 0.3 C or more and 3.6 C or less is 50 mAh/g or more and 90 mAh/g or less.

In the invention, "a metal that reacts with a sulfide solid electrolyte" means a metal that generates a sulfur compound when heated in contact with a sulfide solid electrolyte. Examples of such metals include Cu, Fe, Ni, Co, and Ti.

In the first aspect of the invention, the metal contained in the negative electrode current collector may be Cu, and a value of Cu molar amount/S molar amount of the sulfur compound layer may be 0.01 or more and 1.5 or less.

Further, in the first aspect of the invention, all materials that constitute the solid electrolyte layer may have a melting point of less than 20° C. or higher than 150° C.

A second aspect of the invention is a method for manufacturing an all-solid battery that includes a negative electrode layer containing a sulfide solid electrolyte, a positive electrode layer, a solid electrolyte layer disposed between the positive electrode layer and the negative electrode layer, a negative electrode current collector that is connected to the negative electrode layer and contains a metal that reacts with the sulfide solid electrolyte, and a positive electrode current collector that is connected to the positive electrode layer, and the method includes heating the negative electrode current collector and the negative electrode layer to a temperature of 50° C. or more and 170° C. or less in a state where the negative electrode current collector is in contact with the negative electrode layer.

According to the second aspect of the invention, the metal contained in the negative electrode current collector may be Cu.

Further, according to the second aspect of the invention, all materials that constitute the solid electrolyte layer may have the melting point that is lower than 20° C. or higher than 150° C.

According to the invention, an output of the all-solid battery where the sulfide solid electrolyte contained in the negative electrode layer reacts with the metal contained in the negative electrode current collector can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
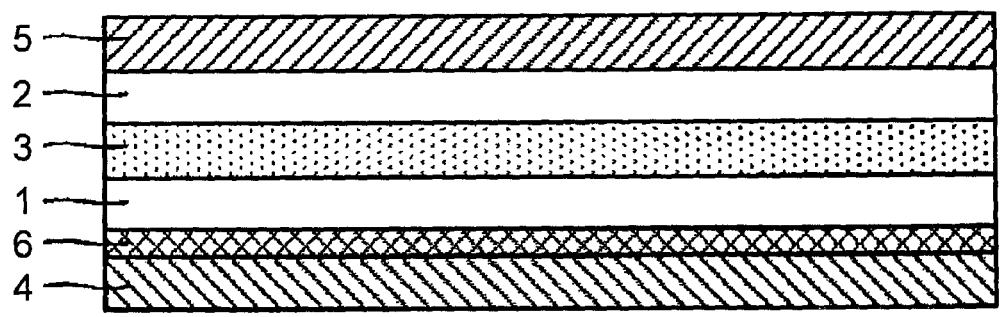
FIG. 1 is a sectional view that describes an all-solid battery 10.

The action and effect described above of the invention will be clarified from modes for carrying out the invention described below. Hereinafter, the invention is described based on an embodiment that is shown in the drawing. However, the invention is not limited to the embodiment. Incidentally, in the drawings shown below, for the purpose of easy understanding, magnitudes and shapes of constituent elements may be exaggerated.

1. All-Solid Battery

FIG. 1 is a sectional view that describes an all-solid battery 10 of the invention. In FIG. 1, an external body for housing electrode layers and a solid electrolyte layer is not shown.

As shown in FIG. 1, the all-solid battery 10 includes a negative electrode layer 1, a positive electrode layer 2, a solid electrolyte layer 3 disposed between the negative electrode layer 1 and the positive electrode layer 2, a negative electrode current collector 4 connected to the negative electrode layer 1, a positive electrode current collector 5 connected to the positive electrode layer 2, and a sulfur compound layer 6 formed between the negative electrode layer 1 and the negative electrode current collector 4. Hereinafter, these constituent elements will be described.

The negative electrode layer 1 is a layer that contains a negative electrode active material and a sulfide solid electrolyte.

As the negative electrode active material contained in the negative electrode layer 1, known negative electrode active materials that can be used in the all-solid battery can properly be used. Examples of such negative electrode active materials include carbon active materials, oxide active materials, and metal active materials. The carbon active material is not particularly limited as long as it contains carbon, and, for example, mesocarbon microbeads (MCMB), highly ordered pyrolytic graphite (HOPG), hard carbon, and soft carbon can be used. As the oxide active material, for example, $Nb_2O_5$, $Li_4Ti_5O_{12}$ and SiO can be used. As the metal active material, for example, In, Al, Si, Sn, and alloys thereof can be used. Further, as the negative electrode active material, a lithium-containing metal active material may be used. The lithium-containing metal active material is not particularly limited as long as it is an active material that contains at least Li, and it may be a lithium metal or a lithium alloy. As the lithium alloy, for example, the alloy that contains Li and at least one kind of In, Al, Si, and Sn can be used. A shape of the negative electrode active material can be formed in particle or in thin film. An average particle size (D50) of the negative electrode active material is preferably 1 nm or more and 100 μm or less, for example, and more preferably 10 nm or more and 30 μm or less. Further, although a content of the negative electrode active material in the negative electrode layer 1 is not particularly limited, it is preferably set to, for example, 40% by mass or more and 99% by mass or less.

Further, as the sulfide solid electrolyte contained in the negative electrode layer 1, known sulfide solid electrolytes that can be used in the negative electrode of the all-solid battery can be used. As such sulfide solid electrolytes, sulfide-based amorphous solid electrolytes such as $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $LiS_2$—$P_2S_5$, and $Li_3PS_4$ can be exemplified. When the sulfide solid electrolyte is used as the solid electrolyte, performance of the all-solid battery can readily be improved.

Further, in the negative electrode layer 1, a conductive assistant that improves the conductivity may be contained. As the conductive assistant, known conductive assistants that can be used in the all-solid battery can properly be used. For example, other than carbon materials such as vapor grown carbon fiber, acetylene black (AB), Ketjen black (KB), carbon nanotube (CNT), metal materials that can withstand an environment during use of the all-solid battery can be used.

Further, the negative electrode layer 1 can also contain a binder that binds the negative electrode active material and the sulfide solid electrolyte. As the binder, known binders that can be contained in the negative electrode layer of the all-solid battery can properly be used. Examples of such binders include butylene rubber (BR), acrylonitrile butadiene rubber (ABR), butadiene rubber (BR), polyvinylidene fluoride (PVdF), and styrene butadiene rubber (SBR).

Still further, when the negative electrode layer 1 is prepared using a slurry-like composition for negative electrode layer prepared by dispersing the negative electrode active material and the like in a liquid, as the liquid for dispersing the negative electrode active material and the like, heptane and the like can be exemplified, and nonpolar solvents can preferably be used. A thickness of the negative electrode layer 1 is preferably 0.1 μm or more and 1 mm or less, for example, and more preferably 1 μm or more and 100 μm or less. Further, the negative electrode layer 1 is preferably prepared through a press process to make it easy to improve performance of the all-solid battery 10.

The positive electrode layer 2 is a layer that contains a positive electrode active material and a solid electrolyte.

As the positive electrode active material that is contained in the positive electrode layer 2, known positive electrode active materials that can be used in the all-solid battery can properly be used. As such positive electrode active material, other than layered active materials such as lithium cobalt oxide ($LiCoO_2$) and lithium nickel oxide ($LiNiO^2$), different element-substituted Li—Mn spinel having a composition represented by $Li_{1+x}Ni_{1/3}Mn_{1/3}Co_{1/3}O_2$ (x is a positive number), lithium manganese oxide ($LiMn_2O_4$), $Li_{1+x}Mn_{2-x-y}M_yO_4$ (M is one or more kinds selected from Al, Mg, Co, Fe, Ni and Zn. X and y are positive numbers), lithium titanate ($Li_xTiOy$) (x and y are positive numbers), and lithium metal phosphate represented by $LiMPO_4$ (M represents Fe, Mn, Co or Ni) can be exemplified. The positive electrode active material can be in any form of particle or thin film, for example. An average particle size (D50) of the positive electrode active material is preferably 1 nm or more and 100 μm or less, for example, and more preferably 10 nm or more and 30 μm or less. Further, although a content of the positive electrode active material in the positive electrode layer 2 is not particularly limited, it is preferably set to, for example, 40% by mass or more and 99% by mass or less.

As the solid electrolyte contained in the positive electrode layer 2, known solid electrolytes that can be used in the all-solid battery can properly be used. As such solid electrolytes, other than oxide-based amorphous solid electrolytes such as $Li_2O—B_2O_3—P_2O_5$ and $Li_2O—SiO_2$, and sulfide-based amorphous solid electrolytes such as $Li_2S—SiS_2$, $LiI—Li_2S—SiS_2$, $LiI—Li_2S—P_2S_5$, $LiI—Li_2S—P_2O_5$, $LiI—Li_3PO_4—P_2S_5$, $Li_2S—P_2S_5$, and $Li_3PS_4$, crystalline oxide/oxynitride such as LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (W is w<1), and $Li_{3.6}Si_{0.6}P_{0.4}O_4$ can be exemplified. However, from the viewpoint to make it easy to improve performance of the all-solid battery 10, the sulfide solid electrolyte is preferably used as the solid electrolyte.

When the sulfide solid electrolyte is used as the solid electrolyte contained in the positive electrode layer 2, a high resistance layer may be formed in an interface between the positive electrode active material and the sulfide solid electrolyte. The positive electrode active material is preferably coated with a coat layer that contains an ion-conductive oxide from the viewpoint of hindering the high resistance layer from being formed and making it easy to hinder a battery resistance from increasing. The coat layer may only contain a substance that has lithium ion conductivity and can maintain a shape without flowing even when coming into contact with the positive electrode active material or the sulfide solid electrolyte. As the ion-conductive oxide that is contained in the coat layer that coats the positive electrode active material, for example, oxides represented by a formula $Li_xAO_y$ (A is B, C, Al, Si, P, S, Ti, Zr, Nb, Mo, Ta or W. X and y are positive numbers.) can be used. Specifically, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$ can be used. Further, the lithium ion conductive oxide may be a composite oxide. As the composite oxide, optional combinations of the lithium ion conductive oxides can be adopted. For example, $Li_4SiO_4$—$Li_3BO_3$ and $Li_4SiO_4$—$Li_3PO_4$ can be used. When a surface of the positive electrode active material is coated with the ion conductive oxide, the ion conductive oxide may at least partially coat the positive electrode active material or may coat all the surface of the positive electrode active material. A thickness of the ion conductive oxide that coats the positive electrode active material is, for example, preferably 0.1 nm or more and 100 nm or less and more preferably 1 nm or more and 20 nm or less. A thickness of the ion conductive oxide can be measured using a transmission electron microscope (TEM), for example.

The positive electrode layer 2 may contain a conductivity assistant that improves the conductivity and a binder that binds the positive electrode active material and the solid electrolyte, and, as required, may contain a thickener.

As the conductive assistant contained in the positive electrode layer 2, known conductive assistants that can be used in the all-solid battery can properly be used. For example, other than carbon materials such as vapor grown carbon fiber, acetylene black (AB), Ketjen black (KB), carbon nanotube (CNT), and carbon nanofiber (CNF), metal materials that can withstand an environment when the solid battery is used can be used.

As the binder contained in the positive electrode layer 2, known binders that can be contained in the positive electrode layer of the solid battery can properly be used. As such binders, butylene rubber (BR), acrylonitrile butadiene rubber (ABR), butadiene rubber (BR), polyvinylidene fluoride (PVdF), and styrene butadiene rubber (SBR) can be exemplified.

Further, when the positive electrode layer 2 is prepared using a slurry-like composition for positive electrode prepared by dispersing the positive electrode active material in a liquid, heptane can be exemplified as a usable liquid, and a nonpolar solvent can preferably be used. A thickness of the positive electrode layer 2 is preferably, for example, 0.1 μm or more and 1 mm or less, and more preferably 1 μm or more and 100 μm or less. Further, the positive electrode layer 2 is preferably prepared through a press process to make it easy to improve performance of the all-solid battery 10.

The solid electrolyte layer 3 is a layer that contains the solid electrolyte.

As the solid electrolyte that is contained in the solid electrolyte layer 3, known solid electrolytes that can be used in the solid electrolyte layer of the all-solid battery can properly be used. As such solid electrolytes, the solid electrolytes that can be contained in the positive electrode layer 2 can be exemplified. Other than these, a binder can be contained in the solid electrolyte layer 3. As the binder that is contained in the solid electrolyte layer 3, known binders that can be used in the solid electrolyte layer of the all-solid battery can properly be used. As such binders, the binders that can be contained in the positive electrode layer 2 can be exemplified.

Further, when the solid electrolyte layer 3 is prepared through a process of coating a slurry-like composition for solid electrolyte that is prepared by dispersing the solid electrolyte and the like in a liquid on the positive electrode layer or the negative electrode layer, as a liquid for dispersing the solid electrolyte and the like, heptane can be exemplified, and nonpolar solvents can preferably be used. A content of the solid electrolyte in the solid electrolyte layer 3 is preferably 60% by mass or more, for example, 70% by mass or more above all, and particularly 80% by mass or more. A thickness of the solid electrolyte layer 3 largely differs depending on a structure of the all-solid battery 10. However, it is preferably 0.1 μm or more and 1 mm or less, and more preferably 1 μm or more and 100 μm or less.

Incidentally, all of materials that constitute the solid electrolyte layer 3 may have a melting point that is lower than 20° C. or higher than 150° C.

The negative electrode current collector 4 is formed with known conductive materials that can be used as the negative electrode current collector of the all-solid battery and contains a metal that reacts with the sulfide solid electrolyte contained in the negative electrode layer 1. "A metal that reacts with a sulfide solid electrolyte" means a metal that generates a sulfur compound when heated in contact with the sulfide solid electrolyte. Specific examples of such metals include Cu, Fe, Ni, Co, and Ti. Therefore, the negative electrode current collector 4 can be formed with metal materials containing one, or two or more elements selected from the group consisting of Cu, Fe, Ni, Co, and Ti, for example, or the metal materials that are plated or deposited with conductive materials such as another metal material or carbon material. Such negative electrode current collector 4 can be formed into a foil or a mesh, for example.

The positive electrode current collector 5 can be formed with known conductive materials that can be used as the positive electrode current collector of the all-solid battery. Therefore, the positive electrode current collector 5 can be formed with a metal material that contains one or two or more elements selected from the group consisting of, for example, stainless steel, Ni, Cr, Au, Pt, Al, Fe, Ti, and Zn. Further, the positive electrode current collector 5 can be formed into a foil or a mesh, for example.

The sulfur compound layer 6 is a layer that contains a sulfur compound that is generated when the sulfide solid electrolyte contained in the negative electrode layer 1 reacts with a metal contained in the negative electrode current collector 4. The sulfur compound layer 6 can be formed by reacting the metal contained in the negative electrode current collector 4 with the solid electrolyte contained in the negative electrode layer 1 by heating under predetermined conditions as described below.

As described above, when the sulfide solid electrolyte contained in the negative electrode layer reacts with the metal contained in the negative electrode current collector, electron conduction resistance in an interface of the negative electrode layer and the negative electrode current collector tends to increase. Therefore, it has been considered that the reaction should be suppressed. However, the inventors have found that when the sulfur compound layer 6 is formed to a certain extent between the negative electrode layer 1 and the negative electrode current collector 4, particularly in the low SOC region, the output can be improved.

As the sulfur compounds contained in the sulfur compound layer 6, for example, metal sulfides such as CuS, $Cu_2S$, NiS, $NiS_2$, FeS, $FeS_2$, $CoS_2$, and $TiS_2$ can be used. Such sulfur compounds can insert and release a Li ion at 0.6 V [vs. $Li/Li^+$] or more. That is, the sulfur compound can show a function like an active material. In the initial charge after manufacture of the all-solid battery (hereinafter, referred to as "initial charge" in some case), by forming a sulfur compound that works like an active material between the negative electrode layer and the negative electrode current collector, compared with the case where the sulfur compound is not formed, a discrepancy in an insertion and removal potential of Li ion is generated. As a result, it can be inferred that, particularly in the low SOC region, potentials of the positive electrode layer and the negative electrode layer become slightly higher and that output of the all-solid battery is improved thereby.

However, when a generation amount of the sulfur compound is excessive, Li ions are excessively extracted from the positive electrode active material until a predetermined voltage is reached in the initial charge, and a decrease in the battery capacity due to degradation of the positive electrode active material and a decrease in output may be caused. The inventors have found that, by optimizing a generation amount of the sulfur compound, the output of the all-solid battery can be improved.

The generation amount of the sulfur compound, as exemplified later in examples, can be determined by a charge capacity in the initial discharge of the all-solid battery. The generation amount of the sulfur compound can be considered appropriate when, in the initial discharge of the all-solid battery, a charge capacity (relative capacity) is 50 mAh/g or more and 90 mAh/g or less during a constant current charge up to 3.6 V under 0.3 C or more and 0.5 C or less, when Cu is used as the negative electrode current collector, 80 mAh/g or less is preferable, and when Fe is used as the negative electrode current collector, 70 mAh/g is less is preferable.

Further, the generation amount of the sulfur compound can be determined also by a ratio of molar amounts of sulfur (S) in the sulfur compound layer 6 and the metal contained in the negative electrode current collector. When Cu is used as the negative electrode current collector, a value of Cu molar amount/S molar amount in the sulfur compound layer 6 is preferably 0.01 or more and 1.5 or less and more preferably 0.1 or more and 1.0 or less.

Although not shown in the drawings, the all-solid battery 10 can be used in a state hermetically sealed by an external body such as a laminate film. As such a laminate film, a resinous laminate film and a film obtained by depositing a metal on the resinous laminate film can be exemplified.

2. Method for Manufacturing All-Solid Battery

Next, a method for manufacturing an all-solid battery of the invention will be described.

As described above, when the sulfur compound layer is formed to a certain extent between the negative electrode layer and the negative electrode current collector, an output of the all-solid battery can be improved. The sulfur compound layer can be formed by heating the negative electrode layer and the negative electrode current collector at a predetermined temperature in a state where the sulfide solid electrolyte contained in the negative electrode layer is in contact with a specified metal contained in the negative electrode current collector. Accordingly, the method for manufacturing the all-solid battery of the invention is a method for manufacturing an all-solid battery that includes a negative electrode layer, a positive electrode layer, a solid electrolyte layer disposed between the positive electrode layer and the negative electrode layer, a negative electrode current collector connected to the negative electrode layer, and a positive electrode current collector connected to the positive electrode layer, in which the negative electrode layer contains a sulfide solid electrolyte, the negative electrode current collector contains a metal that reacts with the sulfide solid electrolyte, and, in a state where the negative electrode current collector is in contact with the negative electrode layer, the negative electrode current collector and the negative electrode layer are heated at a specified temperature.

As described above, a temperature at which the negative electrode current collector and the negative electrode layer are heated is a temperature at which a proper amount of a sulfur compound such as described above is generated between the negative electrode current collector and the negative electrode layer. The temperature can be set to, for example, 50° C. or more and 170° C. or less. Further, a heating time is not particularly limited as long as a proper amount of the sulfur compound such as described above can be generated between the negative electrode current collector and the negative electrode layer.

Figure 2:
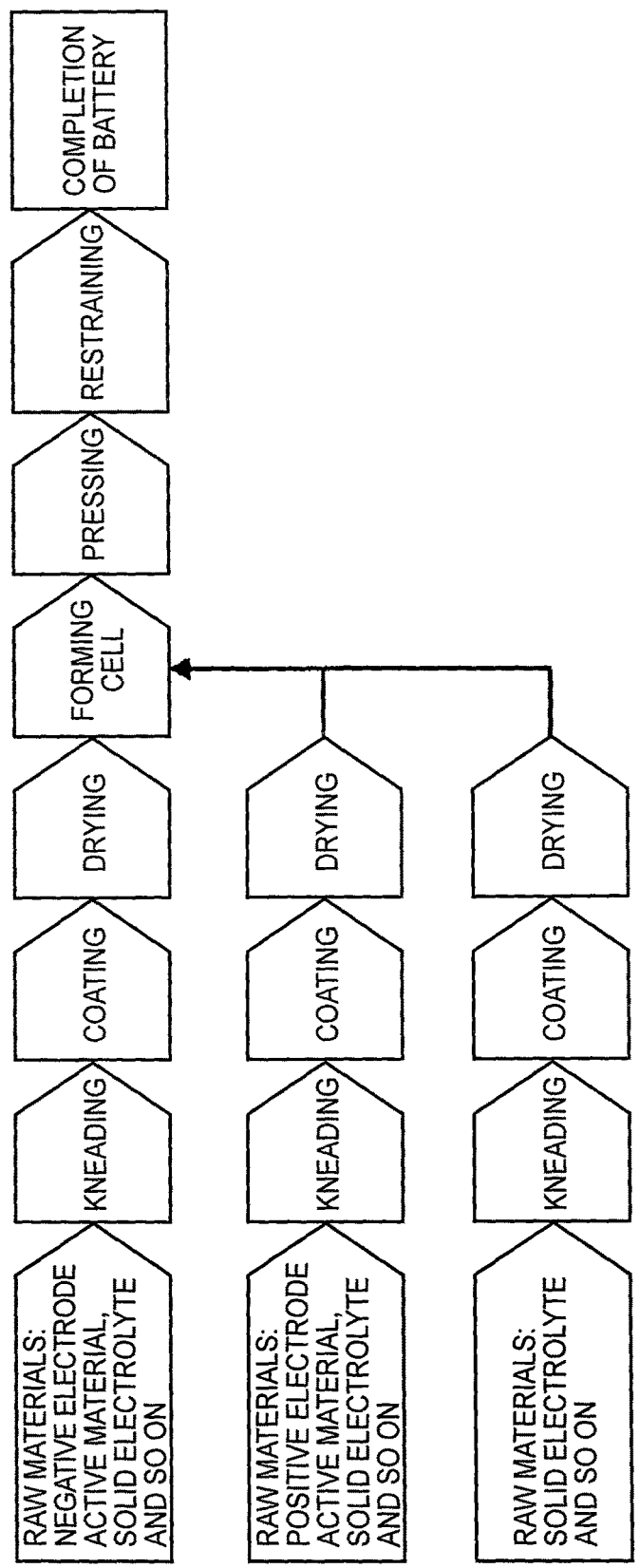
FIG. 2 is a diagram that describes a general method for manufacturing an all-solid battery.

Upon describing a specific example of the method for manufacturing the all-solid battery of the invention, first, a flow of a general method for manufacturing an all-solid battery will be briefly described with reference to FIG. 2. FIG. 2 is a diagram for describing a general method for manufacturing an all-solid battery.

When the all-solid battery is manufactured, first, respective raw materials that constitute a positive electrode layer, a negative electrode layer, and a solid electrolyte layer are prepared. These raw materials are as described above. After preparing these raw materials, these are kneaded, coated, and dried, and thus, a positive electrode layer, a negative electrode layer, and a solid electrolyte layer can be formed. Then, after a positive electrode current collector, the positive electrode layer, the solid electrolyte layer, the negative electrode layer, and the negative electrode current collector are laminated to form a cell, by pressing in a lamination direction to restrain, an all-solid battery can be manufactured. In the manufacturing process of the all-solid battery, in the step of drying (drying step) and the step of pressing (pressing step), raw materials are exposed to a high temperature environment. Therefore, according to the method for manufacturing the all-solid battery of the invention, in the step of drying and/or the step of pressing, it is preferred to heat the negative electrode current collector and the negative electrode layer in a state where the negative electrode current collector is in contact with the negative electrode layer.

The method for manufacturing the all-solid battery of the invention will be specifically described below.

The positive electrode layer can be formed through a process where a slurry-like composition for positive electrode layer that contains a positive electrode active material and a solid electrolyte is coated on a surface of a positive electrode current collector and is dried. The negative electrode layer can be formed through a process where a slurry-like composition for negative electrode layer that contains a negative electrode active material and a sulfide solid electrolyte is coated on a surface of a negative electrode current collector and is dried. A solid electrolyte layer can be formed through a process where a slurry-like composition for solid electrolyte layer that contains a solid electrolyte and a binder is coated on a surface of the positive electrode layer or the negative electrode layer formed as described above and is dried. Thereafter, a laminate body in which the negative electrode current collector, the negative electrode layer, the solid electrolyte layer, the positive electrode layer, and the positive electrode current collector are laminated such that the solid electrolyte layer is sandwiched by the positive electrode layer and the negative electrode layer is prepared and pressed in a lamination direction. In the manufacturing example of the all-solid battery, by heating at a specified temperature in the step of drying the composition for negative electrode layer or the step of pressing the laminate body, a sulfur compound can be formed between the negative electrode layer and the negative electrode current collector.

Incidentally, in the manufacturing example described above of the all-solid battery, for each of the positive electrode layer, the negative electrode layer, and the solid electrolyte layer, a method where materials that constitute each layer are made in a slurry-like composition and the composition is coated and dried is exemplified. However, the invention is not limited to such a form. For example, the positive electrode layer, the negative electrode layer, and the solid electrolyte layer may be formed according to a dry process such as vapor deposition or electrostatic powder coating. In this case, since the drying step is unnecessary, the sulfur compound layer can be formed between the negative electrode layer and the negative electrode current collector by heating at a specified temperature in the pressing step.

1. Preparation of All-Solid Battery

As shown below, the all-solid battery was prepared.

(Preparation of Positive Electrode Layer)

A butyl butylate solution of 5% by mass of a binder (polyvinylidene fluoride (PVdF), manufactured by Kureha Corporation), butyl butylate, $LiNi_{1/3}Co_{1/3}Mn_{1/3}O_2$ having an average particle size of 4 μm as the positive electrode active material, $Li_2S$—$P_2S_5$-based glass ceramic that has an average particle size of 0.8 μm and contains LiI as the sulfide solid electrolyte, and vapor phase grown carbon fiber (VGCF (registered trade mark)) as the conductive assistant were charged in a polypropylene vessel, the mixture was stirred by an ultrasonic disperser (UH-50, manufactured by SMT Co., Ltd.) for 30 seconds. Then, after the vessel was shaken for 3 minutes using a shaker (TTM-1, manufactured by Shibata Scientific Technology Ltd.), the vessel was further stirred for 30 seconds using the ultrasonic disperser, thus, the composition for positive electrode layer was prepared. Then, the composition for positive electrode layer was coated on the positive electrode current collector by a blade method using an applicator, dried on a hot-plate at 100° C. for 30 minutes, thus the positive electrode layer was formed. Incidentally, a carbon-coated aluminum foil (SDX (registered trade mark), manufactured by SHOWA DENKO K. K.) was used for the positive electrode current collector.

(Preparation of Negative Electrode Layer)

A butyl butylate solution of 5% by mass of a binder (polyvinylidene fluoride (PVdF), manufactured by Kureha Corporation), a butyl butylate solution, natural graphite-based carbon having an average particle size of 10 μm (manufactured by Mitsubishi Chemical Company) as the negative electrode active material, and $Li_2S$—$P_2S_5$-based glass ceramic that contains LiI and has an average particle size of 5 μm were charged in a polypropylene vessel, the mixture was stirred for 30 seconds using an ultrasonic disperser (UH-50, manufactured by STM Co., Ltd.). Next, the vessel was shaken using a shaker (TTM-1, manufactured by Shibata Scientific Technology Ltd.) for 30 minutes, thus the composition for negative electrode layer was prepared. Next, the composition for negative electrode layer was coated on the negative electrode current collector according to a blade method using an applicator, dried on a hot-plate at 100° C. for 30 minutes, thus the negative electrode layer was formed. Incidentally, a Cu foil or a Fe foil was used for the negative electrode current collector.

(Preparation of Solid Electrolyte Layer)

A heptane solution of 5% by mass of a butylene rubber (BR)-based binder, butane, and $Li_2S$—$P_2S_5$-based glass ceramic that has an average particle size of 2.5 μm and contains LiI as the solid electrolyte were charged in a polypropylene vessel and stirred for 30 seconds using a ultrasonic disperser (UH-50, manufactured by STM Co., Ltd.). Next, the vessel was shaken for 30 minutes using a shaker (TTM-1, manufactured by Shibata Scientific Technology Ltd.), thus, the composition for solid electrolyte layer was prepared. Then, the composition for solid electrolyte layer was coated on an aluminum foil according to a blade method using an applicator, dried for 30 minutes on a hot-plate at 100° C., thus the solid electrolyte layer was formed.

(Preparation of All-Solid Battery)

In a tubular ceramic having an inner sectional area of 1 cm$^2$, a laminate body of the solid electrolyte layer, the positive electrode layer, and the positive electrode current collector was charged and pressed at 100 MPa. At this time, the solid electrolyte layer and the positive electrode layer were pressed in a lamination direction such that the solid electrolyte layer and the positive electrode layer were superposed in contact. After press, the Al foil was peeled off from the solid electrolyte layer. Thereafter, the negative electrode layer and the negative electrode current collector were charged in the tubular ceramic such that the negative electrode layer came into contact with a surface from which the Al foil of the solid electrolyte layer was peeled, pressed again at 100 MPa in a lamination direction, and a laminate body including the positive electrode current collector, the positive electrode layer, the solid electrolyte layer, the negative electrode layer, and the negative electrode current collector was prepared. Further, the laminate body was hot-pressed for 5 minutes in a lamination direction at 600 MPa at 25° C., 150° C. or 180° C., and the all-solid battery was prepared.

2. Evaluation of Battery Performance

The all-solid battery prepared as shown above was subjected to constant current-constant voltage charge (end current: $\frac{1}{100}$ C) up to 4.55 V at 3 time rate ($\frac{1}{3}$ C). After the initial charge, constant current-constant voltage discharge was conducted up to 3.00 V. Thereafter, charge was conducted up to 3.56 V under constant current-constant voltage charge, and constant current discharge was conducted for 5 seconds at 19.2 mA/cm$^2$. From a voltage decrease and a current value at this time, internal resistance (R=ΔV/ΔI) [Ω·cm$^2$] of the all-solid battery was obtained.

3. Analysis of Generation Amount of Sulfur Compound

A generation amount (Cu mol amount/S mol amount) of the sulfur compound between the negative electrode current collector and the negative electrode layer was analyzed using JSM-6610LA (manufactured by JEOL) that incorporates an energy dispersive X-ray (EDX) analyzer. Among the all-solid batteries prepared as shown above, in an example in which the Cu foil was used as the negative electrode current collector, the negative electrode current collector was peeled, and a surface that was in contact with the negative electrode current collector of the negative electrode layer was subjected to an EDX surface analysis (a region of ×300).

4. Evaluation Results

Figure 3:
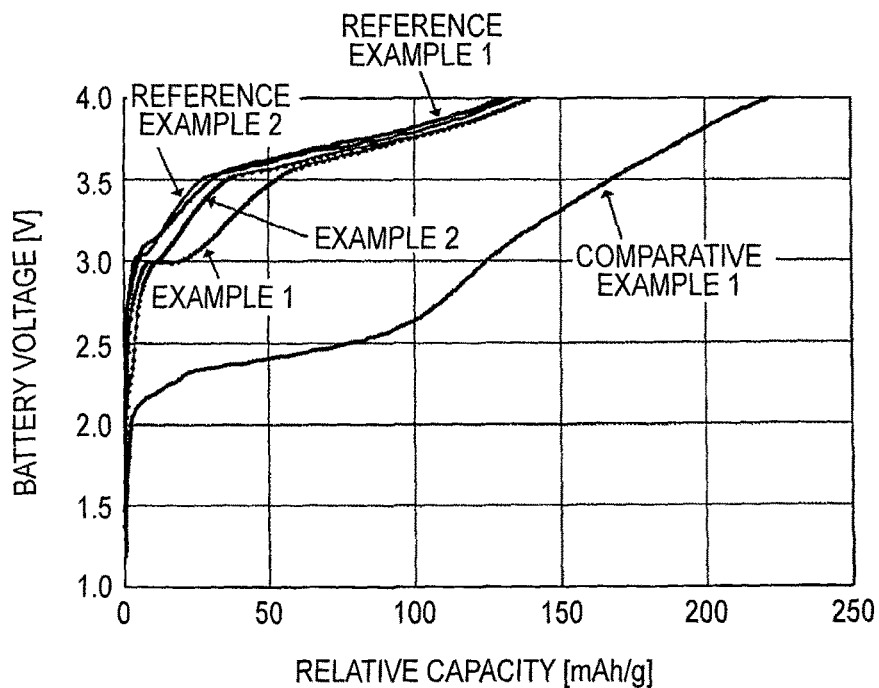
FIG. 3 is a graph that shows a relationship between a charge capacity and a battery voltage in an initial charge of the all-solid battery.
Figure 4:
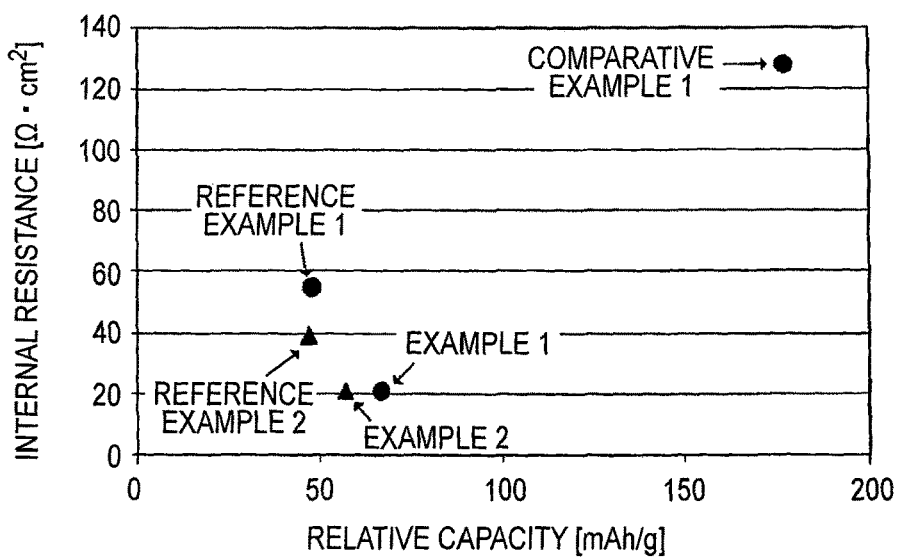
FIG. 4 is a graph that shows a relationship between the charge capacity and internal resistance of the all-solid battery.
Figure 5:
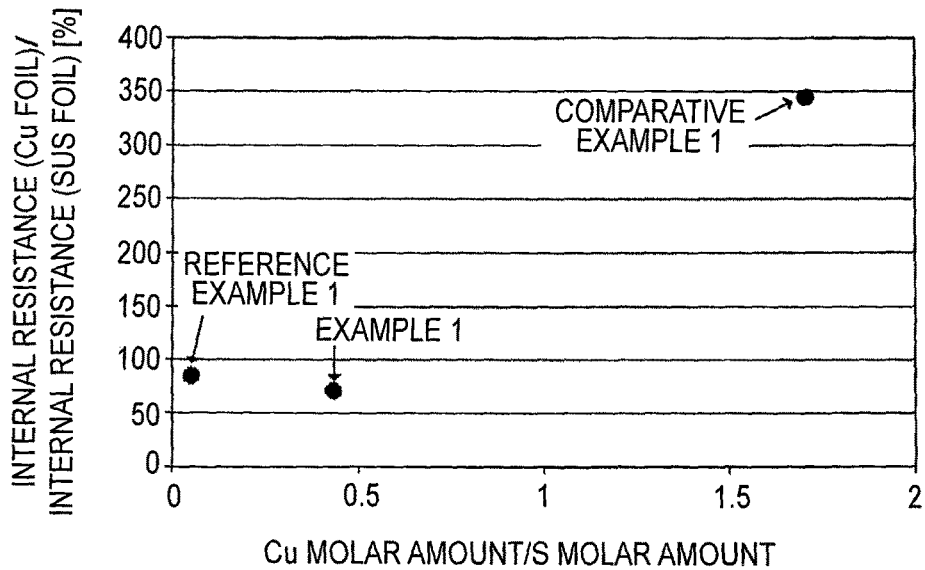
FIG. 5 is a graph that shows a relationship between a composition and the internal resistance of a sulfur compound layer.
Figure 6:
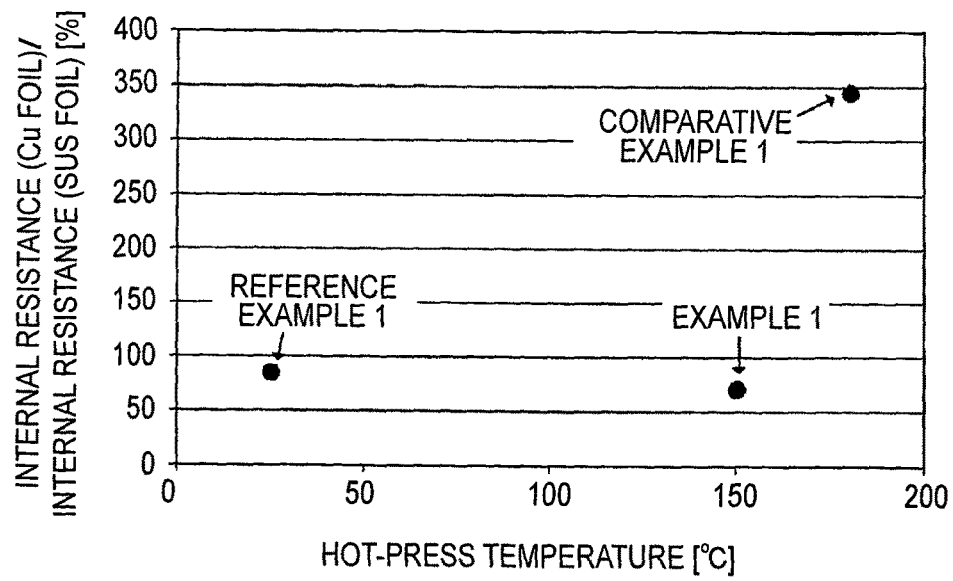
FIG. 6 is a graph that shows a relationship between a temperature during hot-press in a preparation process and the internal resistance of the all-solid battery.

Results of the evaluation and analysis are shown in Table 1 and FIG. 3 to FIG. 6. In the Table 1 below, metal species that constitute the negative electrode current collector (current collector foil), temperatures (hot-press temperature) [° C.] during hot-press in the manufacturing process, charge capacity (charge capacity up to 3.6 V) [mAh/g] until a battery voltage becomes 3.6 V, internal resistance measured as described above of the all-solid battery (internal resistance) [Ω·cm$^2$], internal resistance when the all-solid battery was prepared in the same manner except that stainless steel (SUS) was used as the negative electrode current collector (during use of SUS foil) [Ω·cm$^2$], a ratio of the internal resistance with respect to the internal resistance of the all-solid battery when stainless steel (SUS) was used as the negative electrode current collector (vs. during SUS foil use) [%], and a value of Cu mol amount/S mol amount of the sulfur compound layer analyzed as described above are shown. FIG. 3 shows a relationship between charge capacity [mAh/g] and battery voltage [V] of the all-solid battery in the initial charge. FIG. 4 shows a relationship between the charge capacity [mAh/g] until the battery voltage becomes 3.6 V and the internal resistance of the all-solid battery [Ω·cm$^2$]. FIG. 5 shows a relationship between a value of Cu mol amount/S mol amount analyzed as described above and a ratio [%] of the internal resistance with respect to the internal resistance of the all-solid battery when the stainless steel (SUS) was used as the negative electrode current collector. FIG. 6 shows a relationship between hot-press temperature and a ratio [%] of the internal resistance with respect to the internal resistance when stainless steel (SUS) was used as the negative electrode current collector.

TABLE 1

| Current collector foil | Hot-press temperature [° C.] | Charge capacity up to 3.6 V [mAh/g] | Internal resistance [Ω · cm$^2$] | During use of SUS foil [Ω · cm$^2$] | Vs. during use of SUS foil [%] | Cu mol amount/S mol amount | Remark |
|---|---|---|---|---|---|---|---|
| Cu | 25 | 48 | 55 | 64 | 86 | 0.05 | Reference example 1 |
| Cu | 150 | 67 | 21 | 29 | 72 | 0.43 | Example 1 |
| Cu | 180 | 177 | 128 | 37 | 346 | 1.7 | Comparative example 1 |
| Fe | 25 | 47 | 39 | — | — | — | Reference example 2 |
| Fe | 150 | 57 | 21 | — | — | — | Example 2 |

The sulfur compound generated between the negative electrode layer and the negative electrode current collector can insert and remove a Li ion at 0.6 V or more. Therefore, when the sulfur compound is generated, as shown in FIG. 3, a plateau (an almost flat part) that appears until the battery voltage becomes 3.6 V in a charge curve of the initial charge becomes longer. A length of the plateau depends on a generation amount of the sulfur compound. That is, by charge capacity when the constant current charge was conducted up to 3.6 V of the battery voltage in the initial charge, a generation amount of the sulfur compound can be confirmed.

Further, when seeing Table 1 prepared based on data shown in FIG. 3, in Comparative Example 1 where a large amount of the sulfur compound was considered produced, the internal resistance was very large. On the other hand, in Reference Examples 1 and 2 where in the step of drying a very slight amount of the sulfur compound was considered generated and Examples 1 and 2 where a proper amount of the sulfur compound was considered generated during hot-pressing, the internal resistance became smaller. The internal resistances of Examples 1 and 2 where the generation amount of the sulfur compound was considered proper were particularly low. Like this, it was understood that when a proper amount of the sulfur compound was generated between the negative electrode layer and the negative electrode current collector, the output of the all-solid battery could be improved.

Further, from results shown in FIG. 5 and Table 1, it was understood that whether the generation amount of the sulfur compound was a proper amount or not could be determined also by a mole ratio of a molar amount of a metal element contained in the sulfur compound (Cu molar amount in the Example) and a molar amount of sulfur (S).

Still further, from results shown in FIG. 6 and Table 1, it was understood that the hot-press temperature had an affect on the generation amount of the sulfur compound.

As described above, it was understood that when a proper amount of the sulfur compound was generated between the negative electrode layer and the negative electrode current collector, the output of the all-solid battery could be improved, and whether the generation amount of the sulfur compound was proper or not could be determined by the charge capacity during the initial charge or a mole ratio of the metal element contained in the sulfur compound and sulfur. Further, it is understood that in order to make the generation amount of the sulfur compound appropriate, it is important to set a heating temperature in the manufacturing process of the all-solid battery to a specified temperature.

The invention claimed is:

1. An all-solid battery comprising:
a negative electrode layer that contains a sulfide solid electrolyte;
a positive electrode layer;
a solid electrolyte layer disposed between the positive electrode layer and the negative electrode layer;
a negative electrode current collector that is connected to the negative electrode layer and contains a metal that reacts with the sulfide solid electrolyte; and
a positive electrode current collector that is connected to the positive electrode layer;
wherein:
a sulfur compound layer that contains a sulfur compound generated by a reaction of the sulfide solid electrolyte contained in the negative electrode layer and the metal contained in the negative electrode current collector is present between the negative electrode layer and the negative electrode current collector, and
the metal contained in the negative electrode current collector is Cu, and a molar ratio of Cu to S in the sulfur compound layer is 0.1 or more and 1.5 or less.

2. The all-solid battery according to claim 1, wherein the molar ratio of Cu to S in the sulfur compound layer is 0.1 or more and 1.0 or less.

3. A method for manufacturing an all-solid battery that includes a negative electrode layer that contains a sulfide solid electrolyte, a positive electrode layer, a solid electrolyte layer disposed between the positive electrode layer and the negative electrode layer, a negative electrode current collector that is connected to the negative electrode layer and contains a metal that reacts with the sulfide solid electrolyte, and a positive electrode current collector that is connected to the positive electrode layer, wherein the metal contained in the negative electrode current collector is Cu, comprising:
heating the negative electrode current collector and the negative electrode layer in a state where the negative electrode current collector is in contact with the negative electrode layer under a condition where a molar ratio of Cu to S in a sulfur compound layer is 0.1 or more and 1.5 or less.

4. The method according to claim 3, wherein the negative electrode current collector and the negative electrode layer are heated at a temperature in a range of from 150° C. to 170° C.

* * * * *